(12) United States Patent
Chang et al.

(10) Patent No.: US 11,658,853 B2
(45) Date of Patent: May 23, 2023

(54) RECEIVER FOR COMPENSATING FOR VOLTAGE OFFSET IN REAL TIME AND OPERATION METHOD THEREOF

(71) Applicant: Samsung Electronics Co., Ltd., Suwon-si (KR)

(72) Inventors: Younghwan Chang, Yongin-si (KR); Eun-Young Jin, Hwaseong-Si (KR); Youngseo Kim, Seoul (KR); Kilhoon Lee, Seoul (KR); Hyunwook Lim, Seoul (KR); Seng-Sub Chun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/680,583

(22) Filed: Feb. 25, 2022

(65) Prior Publication Data
US 2022/0376960 A1  Nov. 24, 2022

(30) Foreign Application Priority Data
May 24, 2021 (KR) .......... 10-2021-0066445

(51) Int. Cl.
*H04L 27/01* (2006.01)
*H04B 17/21* (2015.01)

(52) U.S. Cl.
CPC .............. *H04L 27/01* (2013.01); *H04B 17/21* (2015.01)

(58) Field of Classification Search
CPC ................................ H04L 27/01; H04B 17/21
See application file for complete search history.

(56) References Cited

U.S. PATENT DOCUMENTS

| | | | |
|---|---|---|---|
| 6,507,241 B1 | 1/2003 | Ritter | |
| 6,724,329 B2 | 4/2004 | Casper | |
| 9,100,229 B2 | 8/2015 | Jing et al. | |
| 9,385,695 B2 * | 7/2016 | Chen | H04L 25/0296 |
| 9,419,663 B2 * | 8/2016 | Lee | H04L 25/03159 |
| 9,450,788 B1 * | 9/2016 | Cops | H04L 25/03057 |
| 10,341,147 B1 | 7/2019 | Khare et al. | |
| 10,742,458 B2 * | 8/2020 | Fujii | H04L 25/03878 |
| 11,223,468 B1 * | 1/2022 | Ryu | H04L 7/0087 |
| 2006/0093072 A1 * | 5/2006 | Darabi | H04L 27/3809 375/329 |
| 2009/0146722 A1 * | 6/2009 | Chen | H03F 3/45183 327/307 |
| 2012/0269305 A1 * | 10/2012 | Hogeboom | H04L 25/069 375/346 |

(Continued)

*Primary Examiner* — Jaison Joseph
(74) *Attorney, Agent, or Firm* — Muir Patent Law, PLLC

(57) ABSTRACT

An operation method of a receiver, which includes setting a coefficient of an equalizer based on one of a plurality of first codes, setting a coefficient of an amplifier based on one of a plurality of second codes, performing offset calibration by driving the equalizer and the amplifier based on the coefficient of the equalizer and the coefficient of the amplifier, storing an offset code corresponding to a voltage offset generated when the equalizer and the amplifier are driven, determining whether the offset calibration is completed, performing a normal operation of obtaining reception data from an input signal, in response to determining that the offset calibration is completed, and removing the voltage offset based on the offset code, in the normal operation.

19 Claims, 18 Drawing Sheets

(56) References Cited

U.S. PATENT DOCUMENTS

| | | | | |
|---|---|---|---|---|
| 2016/0047713 A1* | 2/2016 | Zhu | ................... | H04B 10/071 |
| | | | | 356/73.1 |
| 2019/0052488 A1* | 2/2019 | Fujii | ................. | H04L 25/03878 |
| 2020/0295974 A1 | 9/2020 | Aleksic et al. | | |
| 2021/0288618 A1* | 9/2021 | Nakamura | ............... | H03G 5/28 |
| 2022/0311449 A1* | 9/2022 | Tachibana | ............... | H04L 25/03 |
| 2022/0376960 A1* | 11/2022 | Chang | ................... | H04B 17/21 |
| 2022/0385444 A1* | 12/2022 | Yue | ........................ | H03L 7/081 |

\* cited by examiner

FIG. 3

LUT1

|      | EQ0   | EQ1   | EQ2   | EQ3   |
|------|-------|-------|-------|-------|
| VGA0 | Code1 | Code2 | Code3 | Code4 |
| VGA1 | Code5 | Code6 | Code7 | Code8 |

FIG. 9A

| | EQ0 | EQ1 | EQ2 | EQ3 | EQ4 | EQ5 | EQ6 | EQ7 | EQ8 | EQ9 |
|---|---|---|---|---|---|---|---|---|---|---|
| VGA0 | C00 | C01 | C02 | C03 | C04 | C05 | C06 | C07 | C08 | C09 |
| VGA1 | C10 | C11 | C12 | C13 | C14 | C15 | C16 | C17 | C18 | C19 |
| VGA2 | C20 | C21 | C22 | C23 | C24 | C25 | C26 | C27 | C28 | C29 |
| VGA3 | C30 | C31 | C32 | C33 | C34 | C35 | C36 | C37 | C38 | C39 |

LUTa

FIG. 9C

| | EQ0 | EQ1 | EQ2 | EQ3 | EQ4 | EQ5 | EQ6 | EQ7 | EQ8 | EQ9 |
|---|---|---|---|---|---|---|---|---|---|---|
| VGA0 | C00 | C01 | C02 | C03 | C04 | C05 | C06 | C07 | C08 | C09 |
| VGA1 | | | | | | | | | | |
| VGA2 | C20 | C21 | C22 | C23 | C24 | C25 | C26 | C27 | C28 | C29 |
| VGA3 | | | | | | | | | | |

LUTc

Set_2 → Set_2'

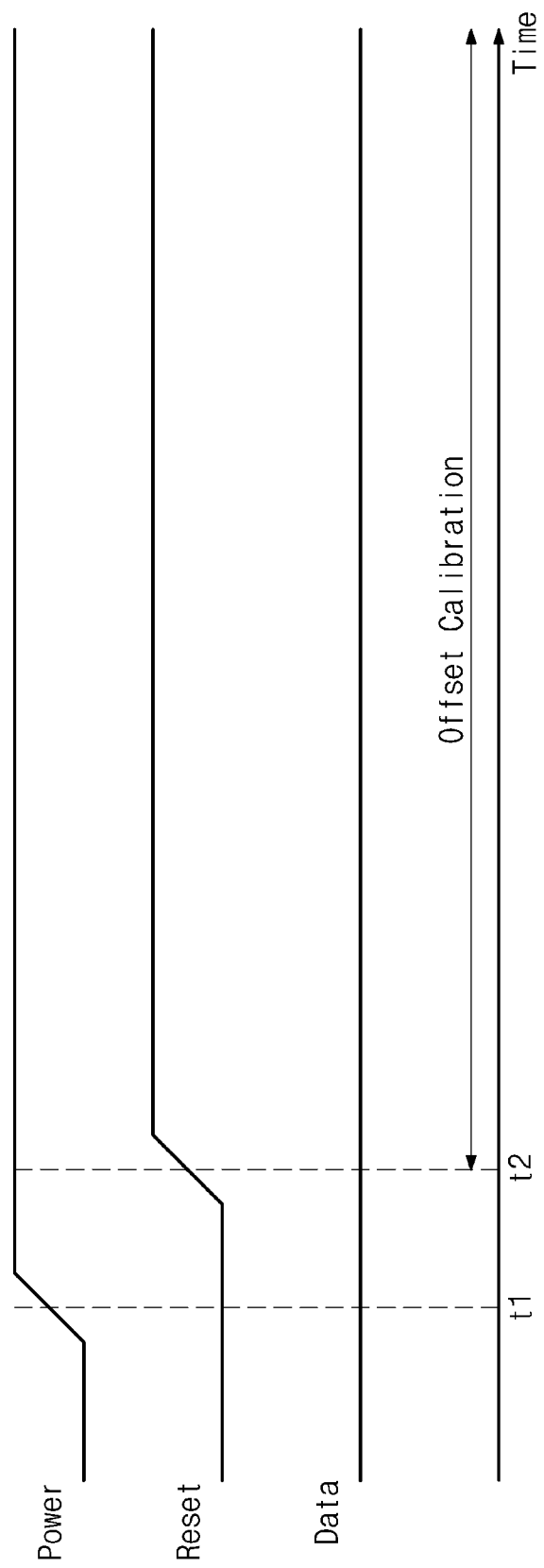

RECEIVER FOR COMPENSATING FOR VOLTAGE OFFSET IN REAL TIME AND OPERATION METHOD THEREOF

CROSS-REFERENCE TO RELATED APPLICATIONS

This application claims priority under 35 U.S.C. § 119 to Korean Patent Application No. 10-2021-0066445 filed on May 24, 2021, in the Korean Intellectual Property Office, the disclosure of which is incorporated by reference herein in its entirety.

BACKGROUND

Embodiments of the present disclosure described herein relate to a serial communication interface, and more particularly, relate to a receiver compensating for a voltage offset, which is caused by changing a coefficient of an analog front end during a normal operation, in real time and an operation method thereof.

In a high-speed serial communication system, data bits may be transmitted in series through a channel. In the case where a signal is transmitted through a channel such as a coaxial cable or a PCB trace, the bandwidth of the channel may be restricted due to a load, skin effect (i.e., an effective increase in the resistance of the channel at higher frequencies due to a change in current density), and a dielectric loss of the channel, and a high-frequency component of the signal may weaken at a receiver. The receiver may include an equalizer for the purpose of compensating for the loss of the high-frequency component. The channel may weaken the high-frequency component of the signal, but the equalizer may boost or reinforce the high-frequency component of the signal.

Meanwhile, a channel may be changed, and a device mismatch due to the channel change may cause a voltage offset making the reliability of the high-speed serial communication system low. Therefore, the equalizer requires a setting change to further compensate for a degradation of a signal resulting from the changed channel. In particular, the high-speed serial communication system may require a device and method capable of compensating for a voltage offset according to a device mismatch in real time during communication of video or image signal.

SUMMARY

Embodiments of the present disclosure provide a receiver removing a voltage offset in real time during a communication operation and an operation method thereof, in a high-speed serial communication system.

According to an embodiment, an operation method of a receiver includes setting a coefficient of an equalizer based on one of a plurality of first codes, setting a coefficient of an amplifier based on one of a plurality of second codes, performing offset calibration by driving the equalizer and the amplifier based on the coefficient of the equalizer and the coefficient of the amplifier, storing an offset code corresponding to a voltage offset generated when the equalizer and the amplifier are driven, determining whether the offset calibration is completed, performing a normal operation of obtaining reception data from an input signal, in response to determining that the offset calibration is completed, and removing the voltage offset based on the offset code, in the normal operation.

According to an embodiment, a receiver includes an analog front end that receives an input signal including transmission data and outputs an output signal by adjusting a waveform of the input signal and amplifying a magnitude of the input signal, a clock and data recovery circuit that recovers a clock signal from the output signal and recovers data based on the clock signal such that the recovered data corresponding to the transmission data are output, a logic circuit that detects a voltage offset from the recovered data and generates an offset code for removing the voltage offset, a register that stores the offset code in the form of a lookup table, and an offset cancellation circuit that generates an offset compensation signal based on the offset code to remove the voltage offset.

According to an embodiment, a receiver includes an equalizer that sets an equalizer coefficient based on one of a plurality of first codes, an amplifier that sets an amplifier coefficient based on one of a plurality of second codes, a logic circuit that generates the plurality of first codes and the plurality of second codes to control the equalizer coefficient and the amplifier coefficient, an offset cancellation circuit that removes a voltage offset, which is generated depending on the equalizer coefficient and the amplifier coefficient, based on an offset code, and a register that stores the offset code. In an offset calibration operation, the logic circuit is configured to change the equalizer coefficient and the amplifier coefficient through the plurality of first codes and the plurality of second codes and generate the offset code corresponding to the voltage offset. In a normal operation, the logic circuit is configured to load a corresponding offset code associated with the equalizer coefficient and the amplifier coefficient and provide the corresponding offset code to the offset cancellation circuit.

BRIEF DESCRIPTION OF THE FIGURES

The above and other objects and features of the present disclosure will become apparent by describing in detail embodiments thereof with reference to the accompanying drawings.

FIG. 3 is a diagram illustrating an embodiment of a lookup table in which offset codes are stored.

FIGS. 9A to 9C are diagrams illustrating embodiments of operation S150 to operation S160 of FIG. 7.

FIG. 13 is a timing diagram illustrating an initial operation of a receiver according to an embodiment of the present disclosure.

DETAILED DESCRIPTION

Various example embodiments will be described more fully hereinafter with reference to the accompanying drawings, in which example embodiments are shown.

Figure 1:
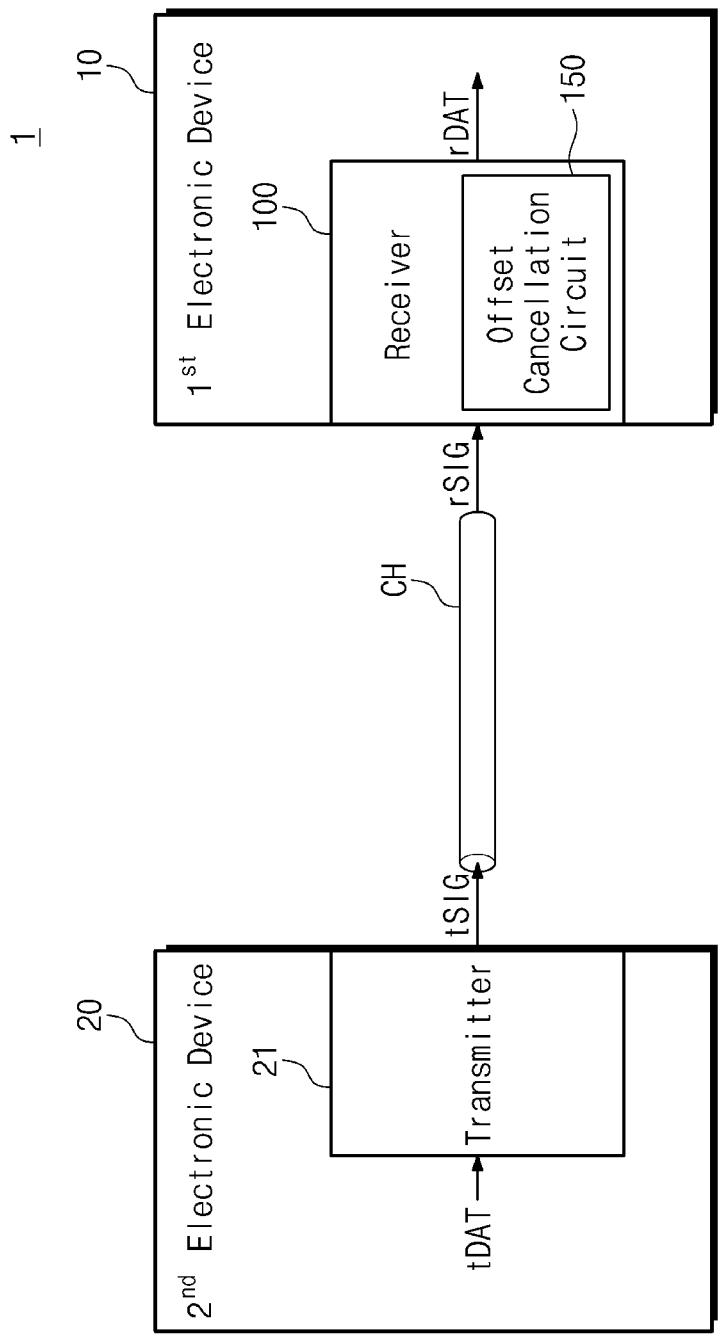
FIG. 1 is a block diagram illustrating a transceiver system according to an embodiment of the present disclosure.

FIG. 1 is a block diagram illustrating a transceiver system according to an embodiment of the present disclosure. Referring to FIG. 1, a transceiver system 1 may include a first electronic device 10 and a second electronic device 20. The first electronic device 10 may communicate with the second electronic device 20 through a channel CH. To this end, the first electronic device 10 may include a receiver 100, and the second electronic device 20 may include a transmitter 21.

In an embodiment, each of the first electronic device 10 and the second electronic device 20 may be implemented in the form of a portable communication terminal, a personal digital assistant (PDA), a portable multimedia player (PMP), a smartphone, or a wearable device or in the form of a computing device such as a personal computer, a server, a workstation, or a notebook computer. Alternatively, each of the first electronic device 10 and the second electronic device 20 may be one of various hardware components, which are included in one user device, such as a processor, a memory device, a storage device, and a control device.

The channel CH may be a communication channel through which data travels from the transmitter 21 to the receiver 100. In an embodiment, the channel CH may be a signal line (i.e., a wired communication channel) electrically connecting the first electronic device 10 and the second electronic device 20 or a wireless communication channel. The transmitter 21 may be an electronic device which generates and/or transmits data across the channel CH. For example, the transmitter 21 may transmit various types of signals such as an electrical signal, an optical signal, and a wireless signal. The receiver 100 may be an electronic device which receives the data transmitted by the transmitter 21. For example, the receiver 100 may receive various types of signals such as an electrical signal, an optical signal, and a wireless signal. Below, for convenience of description, it is assumed that each of the transmitter 21 and the receiver 100 operates based on an electrical signal.

The transmitter 21 may receive transmission data tDAT to be transmitted and may output a transmit signal tSIG corresponding to the transmission data tDAT. The transmission data tDAT may include information which is generated within the second electronic device 20 and is to be transmitted to the first electronic device 10. The transmitter 21 may transfer the transmit signal tSIG to the receiver 100 over the channel CH. The signal received at the receiver 100, corresponding to the transmit signal tSIG transferred to the receiver 100 over the channel CH, is herein referred to as a receive signal rSIG.

The receiver 100 may receive the receive signal rSIG over the channel CH. The receiver 100 may output reception data rDAT based on the receive signal rSIG. The reception data rDAT may include information corresponding to the information included in the transmission data tDAT.

According to an embodiment, the information that the transmitter 21 transmits may be different from the information that the receiver 100 receives. For example, while the transmit signal tSIG passes through the channel CH, the signal may be distorted and/or attenuated due to, for example, noise, capacitive reactance behavior of the channel. The capacitive reactance behavior is frequency dependent such that as the frequency of the signal increases, the gain of the signal decreases (i.e., the channel has a low pass filter behavior). The distortion and/or attenuation thereby results in a change to the information in the transmit signal tSIG such that a difference between the transmit signal tSIG and the receive signal rSIG occurs. This difference between the transmit signal tSIG and the receive signal rSIG may be referred to as data error. Data error may cause an error or an abnormal operation at the first electronic device 10. The receiver 100 may include various hardware circuits (e.g., an equalizer and an amplifier) for the purpose of removing the noise from the receive signal rSIG, amplifying the receive signal, and appropriately outputting the reception data rDAT such that the data error is minimized and the signal quality is increased.

The equalizer, through the use of varying filters, may compensate for the loss of the high-frequency component of the transmit signal tSIG as it passes through the channel CH. The receiver 100 may set coefficients of the equalizer and the amplifier for the purpose of minimizing the data error. Because characteristics of channels are different from each other, a channel change may require a change of the coefficients of the equalizer and the amplifier. The receiver 100 may reduce a data error by setting the coefficients of the equalizer and the amplifier depending on a channel.

However, when the coefficients of the equalizer and the amplifier are changed during a data communication operation, a voltage offset is caused due to a device mismatch. For example, the receiver 100 may communicate with a third electronic device (not illustrated) while communicating with the second electronic device 20. In this case, a change of the coefficients of the equalizer and the amplifier may be required depending on a channel, which may accompany a voltage offset. The voltage offset may cause a jitter. The jitter indicates a phase difference between a transition point of a data value of ideal reception data and a transition point of a data value of actual reception data. The occurrence of the jitter may reduce a timing margin and may cause an error of data.

According to an embodiment, the receiver 100 may include an offset cancellation circuit 150. The offset cancellation circuit 150 may remove a voltage offset due to a device mismatch. The receiver 100 may store an offset code according to coefficients of an equalizer and an amplifier before a normal operation, and the offset cancellation circuit 150 may remove a voltage offset according to a channel change based on the offset code stored in advance. A process to remove a voltage offset will be described in detail with reference to FIG. 2.

A configuration and an operation of the receiver 100 described above will be described in more detail with reference to the following drawings.

Figure 2:
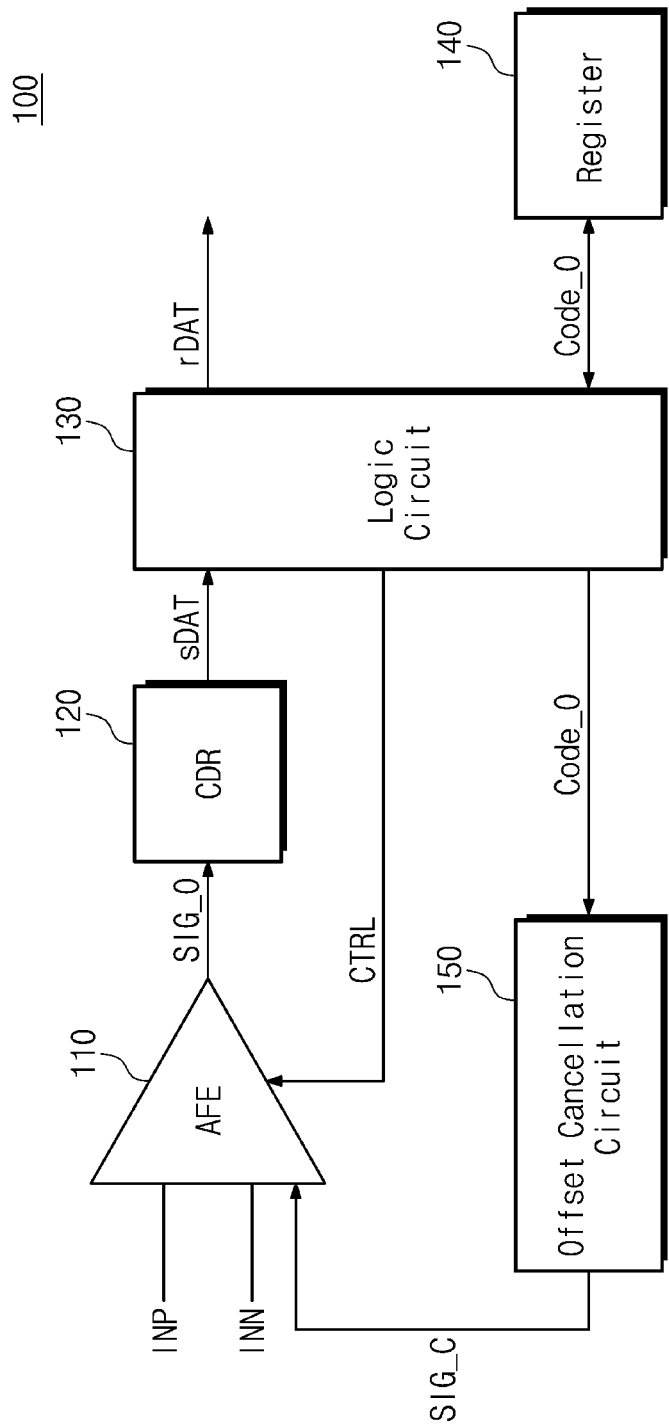
FIG. 2 is a block diagram illustrating a receiver according to an embodiment of the present disclosure.

FIG. 2 is a block diagram illustrating a receiver according to an embodiment of the present disclosure. Referring to FIGS. 1 and 2, the receiver 100 may include an analog front end (AFE) 110, a clock and data recovery circuit (CDR) 120, a logic circuit 130, a register 140, and the offset cancellation circuit 150.

The analog front end 110 may adjust and amplify a waveform of the receive signal rSIG. The receive signal rSIG may include a differential input signal (for convenience of description, hereinafter referred to as a "differential input signal INP and INN") that includes a pair of differential input signals INP and INN. The analog front end 110 may correct a signal distortion of the differential input signal INP and INN and may amplify the differential input signal INP and INN with a variable gain. The analog front end 110 may receive a control signal CTRL from the logic circuit 130. The analog front end 110 may correct and amplify the differential input signal INP and INN based on the control signal CTRL.

The analog front end 110 may further receive a compensation signal SIG_C from the offset cancellation circuit 150. The compensation signal SIG_C may include an offset compensation voltage. The analog front end 110 may compensate for a voltage offset based on the compensation signal SIG_C.

The analog front end 110 may correct the differential input signal INP and INN based on the control signal CTRL and the compensation signal SIG_C and thus may output an output signal SIG_O. The output signal SIG_O may be different from the receive signal rSIG of FIG. 1 in that noise is reduced, a magnitude is amplified, and offset compensation is made. The output signal SIG_O may include the reception data rDAT.

The clock and data recovery circuit 120 may receive the output signal SIG_O from the analog front end 110. The clock and data recovery circuit 120 may recover a clock signal and data from the output signal SIG_O. For example, the clock and data recovery circuit 120 may detect a transition timing of the reception data rDAT from the output signal SIG_O, and may generate a reference clock signal having a rising edge or a falling edge at the transition timing. The clock and data recovery circuit 120 may output recovered data sDAT synchronized with the reference clock signal.

The logic circuit 130 may receive the recovered data sDAT from the clock and data recovery circuit 120. The logic circuit 130 may output the reception data rDAT based on the recovered data sDAT. The reception data rDAT may correspond to the transmission data tDAT transmitted from the first electronic device 10 to the second electronic device 20 of FIG. 1. For example, the reception data rDAT may be substantially the same as the transmission data tDAT. The logic circuit 130 may include at least one of a central processing unit (CPU), an image signal processing unit (ISP), a digital signal processing unit (DSP), a graphics processing unit (GPU), a vision processing unit (VPU), and a neural processing unit (NPU).

The logic circuit 130 may output the control signal CTRL for controlling the analog front end 110. The control signal CTRL may change a coefficient of the analog front end 110. In the specification, below, the coefficient of the analog front end 110 may be coefficients for adjusting an equalizer and an amplifier included in the analog front end 110. For example, the control signal CTRL may set or change the coefficients of the equalizer and the amplifier. The equalizer and the amplifier may change a gain or a cutoff frequency of the differential input signal INP and INN based on the control signal CTRL.

The logic circuit 130 may detect a voltage offset from the recovered data sDAT. For example, the logic circuit 130 may compare an input signal (i.e., the receive signal rSIG as illustrated in FIG. 1) and an output signal (i.e., the recovered data sDAT as illustrated in FIG. 2) of the clock and data recovery circuit 120 while sequentially changing the equalizer coefficient and the amplifier coefficient from a minimum value to a maximum value. For example, when the input signal is "0", the logic circuit 130 may detect an offset value of the output signal as a voltage offset.

The logic circuit 130 may generate an offset code Code_O corresponding to the voltage offset. Because the voltage offset varies depending on the coefficient of the analog front end 110, the offset code Code_O may also vary depending on the coefficient of the analog front end 110. The logic circuit 130 may store the offset code Code_O according to the coefficient of the analog front end 110 in the register 140.

According to an embodiment, the offset code Code_O may be stored in the register 140 in the form of a lookup table LUT. Referring to FIG. 3, the analog front end 110 may include an equalizer and a variable gain amplifier, the equalizer may be set to one of four coefficients, and the variable gain amplifier may be set to one of two coefficients. The four coefficients for the equalizer may respectively correspond to first codes EQ0, EQ1, EQ2, and EQ3 being a digital signal, and the two coefficients of the variable gain amplifier may respectively correspond to second codes VGA0 and VGA1 being a digital signal. In the specification, below, a coefficient and a first code of the equalizer may be interchangeably used, and a coefficient and a second code of the variable gain amplifier or the amplifier may be interchangeably used.

As illustrated in FIG. 3, a lookup table LUT1 may include offset codes Code1, Code2, Code3, Code4, Code5, Code6, Code7, and Code8 that are determined by the first codes EQ0, EQ1, EQ2, and EQ3 and the second codes VGA0 and VGA1. For example, each of the offset codes Code1, Code2, Code3, Code4, Code5, Code6, Code7, and Code8 may be expressed by bit "0" or bit "1".

The logic circuit 130 may generate the offset codes Code1, Code2, Code3, Code4, Code5, Code6, Code7, and Code8 while changing the first codes EQ0, EQ1, EQ2, and EQ3 and the second codes VGA0 and VGA1 in an offset calibration operation and may store offset codes Code1 to Code8 in the lookup table LUT1.

Returning to FIG. 2, in the offset calibration operation, the logic circuit 130 may load the offset code Code_O from the register 140 and may provide the offset code Code_O to the offset cancellation circuit 150. The offset calibration operation that is performed before a normal operation will be described with reference to FIG. 7.

The offset cancellation circuit 150 may receive the offset code Code_O from the logic circuit 130 and may output the compensation signal SIG_C. The compensation signal SIG_C is a signal for removing a voltage offset and may include an offset compensation voltage. The offset cancellation circuit 150 may compensate for a voltage offset by providing the compensation signal SIG_C to the analog front end 110.

As described above, to minimize a data error according to a channel change (or switch), the receiver 100 may change a coefficient of the analog front end 110 depending on a channel. The coefficient of the analog front end 110 may be a parameter determined depending on a characteristic of a channel; when the channel CH is changed, the coefficient of the analog front end 110 may be changed to reduce an error.

Also, the receiver 100 may in advance store the offset code Code_O corresponding to a changed coefficient of the analog front end 110 through the offset calibration operation before the normal operation. The receiver 100 may compensate for a voltage offset based on the offset code Code_O, before the normal operation or during the normal operation. That is, the receiver 100 may compensate for a voltage offset due to a change of a coefficient of the analog front end 110, based on the offset code Code_O.

Figure 4:
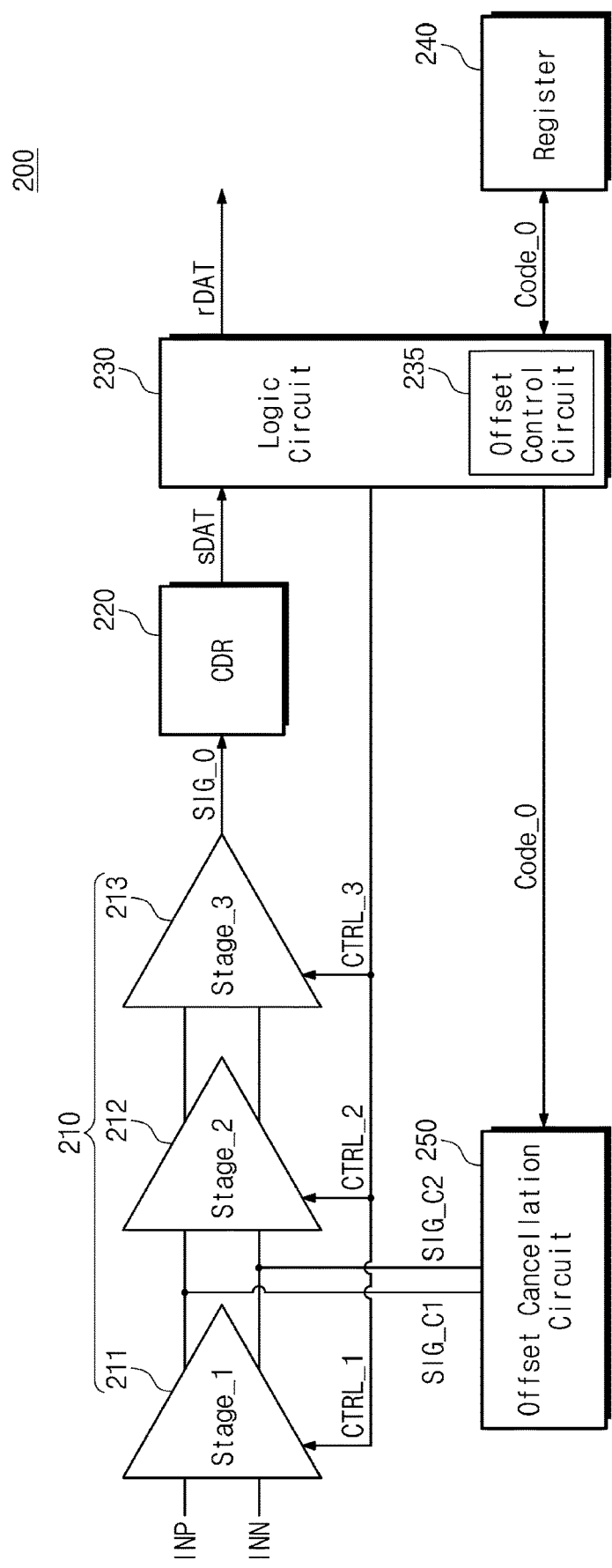
FIG. 4 is a block diagram illustrating an embodiment of a receiver of FIG. 2 in detail.

FIG. 4 is a block diagram illustrating an embodiment of a receiver of FIG. 2 in detail. Referring to FIGS. 2 and 4, a receiver 200 may include an analog front end 210, a clock and data recovery circuit 220, a logic circuit 230, a register 240, and an offset cancellation circuit 250. The analog front end 210, the clock and data recovery circuit 220, the logic circuit 230, the register 240, and the offset cancellation circuit 250 are similar to the analog front end 110, the clock and data recovery circuit 120, the logic circuit 130, the register 140, and the offset cancellation circuit 150 of FIG. 2, and thus, additional description will be omitted to avoid redundancy.

The analog front end 210 may adjust or amplify a waveform of the differential input signal INP and INN through a plurality of steps. For example, the analog front end 210 may include a first stage 211, a second stage 212, and a third stage 213. The first stage 211 may adjust or amplify a waveform of the differential input signal INP and INN. The second stage 212 and the third stage 213 may sequentially adjust or amplify an output signal of the first stage 211.

According to an embodiment, each of the first stage 211, the second stage 212, and the third stage 213 may operate as an equalizer, an amplifier, or a comparator. For example, the equalizer may include a continuous time linear equalizer (hereinafter referred to as "CTLE"). The CTLE may be configured to correct a signal distortion that is caused as a high frequency of a signal is attenuated by a channel. For example, the amplifier may include a variable gain amplifier (hereinafter referred to as "VGA"). The VGA may be configured to amplify an input signal with a variable gain.

The first stage 211 may operate as the CTLE. The first stage 211 may receive a first control signal CTRL_1 from the logic circuit 230 and may change a coefficient of the CTLE based on the first control signal CTRL_1. For example, the first control signal CTRL_1 may change a gain of the first stage 211.

The second stage 212 may operate as the VGA. The second stage 212 may receive a second control signal CTRL_2 from the logic circuit 230 and may change a coefficient of the VGA based on the second control signal CTRL_2. For example, the second control signal CTRL_2 may change a gain of the second stage 212.

The third stage 213 may operate as the CTLE or the VGA. The third stage 213 may receive a third control signal CTRL_3 from the logic circuit 230 and may change a coefficient of the CTLE or the VGA based on the third control signal CTRL_3. For example, the third control signal CTRL_3 may change a gain of the third stage 213.

The clock and data recovery circuit 220 may receive the output signal SIG_O from the third stage 213. In the normal operation, the logic circuit 230 may process the recovered data sDAT to output the reception data rDAT.

The logic circuit 230 may further include an offset control circuit 235. The offset control circuit 235 may generate the offset code Code_O in the offset calibration operation. The offset control circuit 235 may detect a voltage offset from the recovered data sDAT and may generate the offset code Code_O corresponding to the detected voltage offset. The offset control circuit 235 may store the offset code Code_O in the register 240 in the form of a lookup table.

The offset control circuit 235 may provide the offset code Code_O to the offset cancellation circuit 250. When a coefficient of the CTLE or the VGA is changed during the normal operation, the offset control circuit 235 may load a corresponding offset code Code_O from the register 240 and may provide the corresponding offset code Code_O to the offset cancellation circuit 250.

The offset cancellation circuit 250 may generate a differential compensation signal corresponding to the offset code Code_O provided from the offset control circuit 235, and the differential compensation signal may include a pair of differential signals SIG_C1 and SIG_C2 and may be hereinafter referred to as a "differential compensation signal SIG_C1 and SIG_C2". The offset cancellation circuit 250 may be connected between the first stage 211 and the second stage 212. The offset cancellation circuit 250 may provide the differential compensation signal SIG_C1 and SIG_C2 as an input of the second stage 212.

Figure 5:
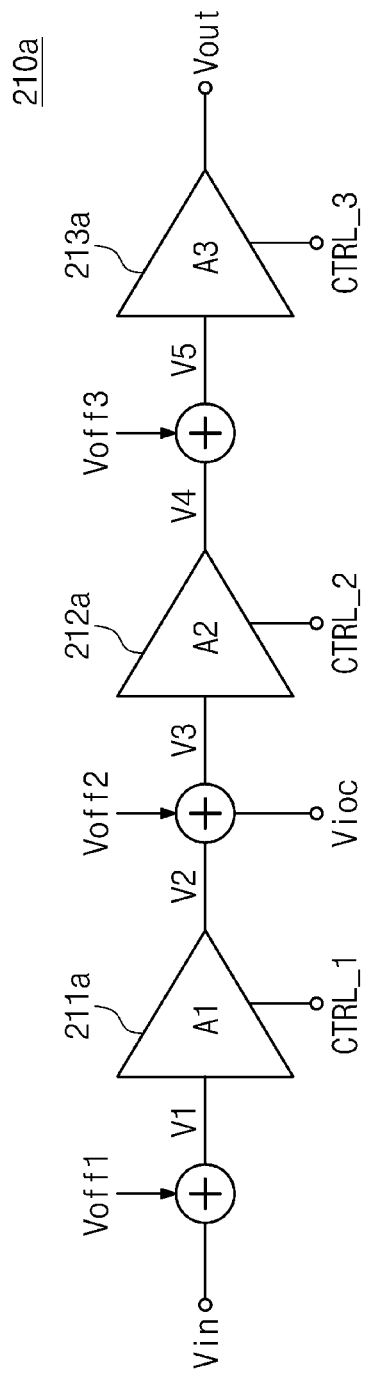
FIG. 5 is a conceptual diagram for deriving a voltage offset according to a device mismatch of an analog front end of FIG. 4 in the form of an equation.

FIG. 5 is a conceptual diagram for deriving a voltage offset according to a device mismatch of an analog front end of FIG. 4 in the form of an equation. Referring to FIGS. 2, 4, and 5, an analog front end 210a may include a first stage 211a, a second stage 212a, and a third stage 213a. The first stage 211a, the second stage 212a, and the third stage 213a are similar to the first stage 211, the second stage 212, and the third stage 213 of FIG. 4, and thus, additional description will be omitted to avoid redundancy.

Each of the first stage 211a, the second stage 212a, and the third stage 213a may change a gain depending on a channel change. For example, the first stage 211a may have a first gain A1 based on the first control signal CTRL_1. The first gain A1 may be determined by a CTLE coefficient of the first stage 211a. The second stage 212a may have a second gain A2 based on the second control signal CTRL_2. The second gain A2 may be determined by a VGA coefficient of the second stage 212a. The third stage 213a may have a third gain A3 based on the third control signal CTRL_3. The third gain A3 may be determined by a CTLE coefficient or a VGA coefficient of the third stage 213a.

A voltage offset may not be canceled out only by changing gains of the first stage 211a, the second stage 212a, and the third stage 213a. In this case, the offset cancellation circuit 250 of FIG. 4 may compensate for a voltage offset by providing an offset compensation voltage Vioc to an input of the second stage 212a.

A relationship of input and output voltages according to voltage offsets Voff1, Voff2, and Voff3 and the offset compensation voltage Vioc is expressed by Equation 1 below.

$$Vout = A1A2A3*(Vin+Voff1) + A2A3*(Voff2+Vioc) + A3*Voff3 \quad \text{[Equation 1]}$$

Referring to Equation 1, Vout is an output voltage of the analog front end 210a, and Vin is an input voltage of the analog front end 210a. A1, A2, and A3 are gains of the first to third stages 211a, 212a, and 213a, respectively, Voff1, Voff2, and Voff3 are voltage offsets respectively occurring at the first to third stages 211a, 212a, and 213a, and Vioc is an offset compensation voltage.

As a VGA coefficient or a CTLE coefficient is changed, the analog front end 210a may have the first to third offset voltages Voff1, Voff2, and Voff3, and the first to third offset voltages Voff1, Voff2, and Voff3 may be respectively input to the first to third stages 211a, 212a, and 213a. According to an embodiment not illustrated, the first to third offset voltages Voff1, Voff2, and Voff3 may occur at outputs of the first to third stages 211a, 212a, and 213a, respectively. Below, for convenience of description, it is assumed that the first to third offset voltages Voff1, Voff2, and Voff3 occur at inputs of the first to third stages 211a, 212a, and 213a, respectively.

Equation 1 above may be substituted like Equation 2 below.

$$\frac{Vout}{A1A2A3} = (Vin + Voff1) + \frac{(Voff2 + Vloc)}{A1} + \frac{Voff3}{A1A2} \quad \text{[Equation 2]}$$

Referring to Equation 2, the input voltage Vin may be "0" in the offset calibration operation, and the receiver 200 may adjust the offset compensation voltage Vioc such that the output voltage Vout is "0".

That is, the receiver 200 may output the offset compensation voltage Vioc while adjusting the first to third gains A1, A2, and A3 of the first to third stages 211a, 212a, and 213a. The offset calibration operation may refer to an operation of finding (or selecting) the offset compensation voltage Vioc, which allows the output voltage Vout to be "0", depending on the first to third gains A1, A2, and A3.

However, as illustrated in FIG. 5, in the case where it is assumed that the first to third offset voltages Voff1, Voff2, and Voff3 occur at inputs of the first to third stages 211a, 212a, and 213a, respectively, there may be no influence of the third gain A3 in the offset calibration operation. Therefore, the receiver 200 may complete the offset calibration operation by storing the offset code Code_O according to the CTLE coefficient of the first stage 211a and the VGA coefficient of the second stage 212a.

In the specification, for convenience of description, below, the description will be given under the condition that the first stage 211a is an equalizer (e.g., a CTLE), the second stage 212a is an amplifier (e.g., a VGA), and the offset compensation voltage Vioc is determined based on the first gain A1 and the second gain A2.

Figure 6A:
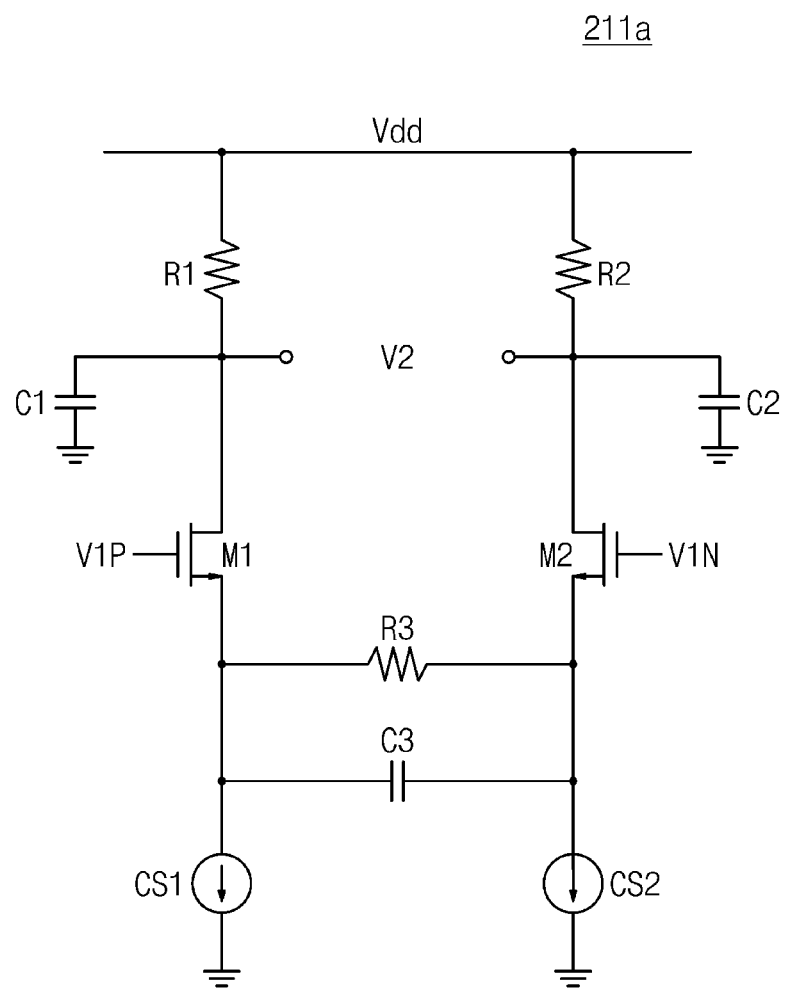
FIGS. 6A and 6B are circuit diagrams illustrating embodiments of at least one of first to third stages of FIG. 5 in detail.
Figure 6B:
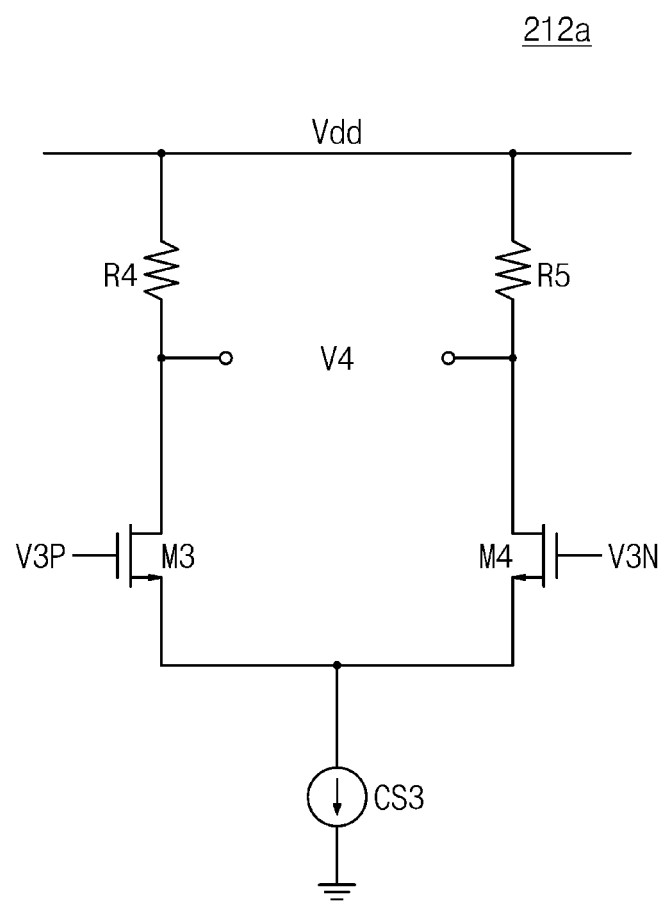

FIGS. 6A and 6B are circuit diagrams illustrating embodiments of at least one of first to third stages of FIG. 5 in detail. For example, FIG. 6A may be a circuit diagram of the first stage 211a of FIG. 5, and FIG. 6B may be a circuit diagram of the second stage 212a of FIG. 5. According to an embodiment, the third stage 213a of FIG. 5 may be implemented with the circuit of FIG. 6A or 6B. Below, the first stage 211a and the second stage 212a are not limited to the circuit diagrams of FIGS. 6A and 6B.

Referring to FIGS. 5 and 6A, the first stage 211a may include a first transistor M1, a second transistor M2, a first resistor R1, a second resistor R2, a third resistor R3, a first capacitor C1, a second capacitor C2, a third capacitor C3, a first current source CS1, and a second current source CS2.

The first stage 211a may receive a first voltage V1 and may output a second voltage V2. The first voltage V1 may be a signal corresponding to a sum of the input voltage Vin and the first voltage offset Voff1 of FIG. 5. The second voltage V2 may be a signal generated by adjusting a waveform of the first voltage V1 or by amplifying a magnitude of the first voltage V1. According to an embodiment, each of the first voltage V1 and the second voltage V2 may be composed of a pair of differential signals. For example, the first voltage V1 may include a first differential signal V1P and a second differential signal V1N.

The first differential signal V1P may be applied to a gate terminal of the first transistor M1. A drain terminal of the first transistor M1 may be connected with a first end of the first resistor R1 and a first end of the first capacitor C1. A source terminal of the first transistor M1 may be connected with the first current source CS1, a first end of the third resistor R3, and a first end of the third capacitor C3. The first transistor M1 may control the amount of current flowing between the drain terminal and the source terminal depending on the first differential signal V1P or may operate as a switch.

The second differential signal V1N may be applied to a gate terminal of the second transistor M2. A drain terminal of the second transistor M2 may be connected with a first end of the second resistor R2 and a first end of the second capacitor C2. A source terminal of the second transistor M2 may be connected with the second current source CS2, a second end of the third resistor R3, and a second end of the third capacitor C3. The second transistor M2 may control the amount of current flowing between the drain terminal and the source terminal depending on the second differential signal V1N or may operate as a switch.

A second end of the first resistor R1 and a second end of the second resistor R2 may be connected with a power supply voltage Vdd. A second end of the first capacitor C1 and a second end of the second capacitor C2 may be connected with a ground voltage. The first resistor R1 and the first capacitor C1 may constitute a low pass filter. The second resistor R2 and the second capacitor C2 may constitute a low pass filter. The low pass filters (R1, C1) and (R2, C2) may filter a high-frequency component.

The first current source CS1 may generate a bias current flowing through the first transistor M1. The second current source CS2 may generate a bias current flowing through the second transistor M2. Each of the current sources CS1 and CS2 may be implemented with a transistor that has a gate terminal configured to receive a bias voltage, a drain terminal connected with the corresponding one of the transistors M1 and M2, and a source terminal connected with the ground voltage.

The third resistor R3 and the third capacitor C3 may be connected in parallel between the source terminals of the transistors M1 and M2. The third resistor R3 and the third capacitor C3 may amplify, compensate, or recover a high-frequency component of a transmit signal, which weakens due to the channel loss. In this regard, the first stage 211a may be a CTLE. Also, the first stage 211a may be a high pass filter that boosts the high-frequency component of the transmit signal.

According to an embodiment, the first stage 211a may adjust a resistance value of the third resistor R3 based on the first control signal CTRL_1. The resistance value of the third resistor R3 may determine a boosting gain, and the first stage 211a may determine the first gain A1 by adjusting the resistance value of the third resistor R3.

According to an embodiment, the first stage 211a may generate the second voltage V2 by comparing the first differential signal V1P and the second differential signal V1N and amplifying a voltage difference between the first differential signal V1P and the second differential signal V1N. In this regard, the first stage 211a may be a VGA.

Referring to FIGS. 5, 6A, and 6B, the second stage 212a may include a third transistor M3, a fourth transistor M4, a fourth resistor R4, a fifth resistor R5, and a third current source CS3.

The second stage 212a may receive a third voltage V3 and may output a fourth voltage V4. The third voltage V3 may be a signal corresponding to a sum of the second voltage V2, the offset compensation voltage Vioc, and the second voltage offset Voff2 of FIG. 5. The fourth voltage V4 may be a signal generated by adjusting a waveform of the third voltage V3 or by amplifying a magnitude of the third voltage V3. According to an embodiment, each of the third voltage V3 and the fourth voltage V4 may be composed of a pair of differential signals. For example, the third voltage V3 may include a third differential signal V3P and a fourth differential signal V3N.

The third transistor M3 and the fourth transistor M4 are similar to the first transistor M1 and the second transistor M2 of FIG. 6A, and thus, additional description will be omitted to avoid redundancy.

The third differential signal V3P may be applied to a gate terminal of the third transistor M3. A source terminal of the third transistor M3 may be connected with the third current source CS3, and a drain terminal of the third transistor M3 may be connected with a first end of the fourth resistor R4. The fourth differential signal V3N may be applied to a gate terminal of the fourth transistor M4. A source terminal of the fourth transistor M4 may be connected with the third current source CS3, and a drain terminal of the fourth transistor M4 may be connected with a first end of the fifth resistor R5.

The third current source CS3 may generate a bias current flowing through the transistors M3 and M4. A gain of the second stage 212a may vary depending on a magnitude of the bias current. In this regard, the second stage 212a may be a VGA. The third current source CS3 may be implemented with a transistor that has a gate terminal configured to receive a bias voltage, a drain terminal connected with the transistors M3 and M4, and a source terminal connected with the ground voltage.

The fourth resistor R4 may be connected between the power supply voltage Vdd and the drain terminal of the third transistor M3. The fifth resistor R5 may be connected between the power supply voltage Vdd and the drain terminal of the fourth transistor M4. The second stage 212a may be a symmetrical differential amplifier.

Figure 7:
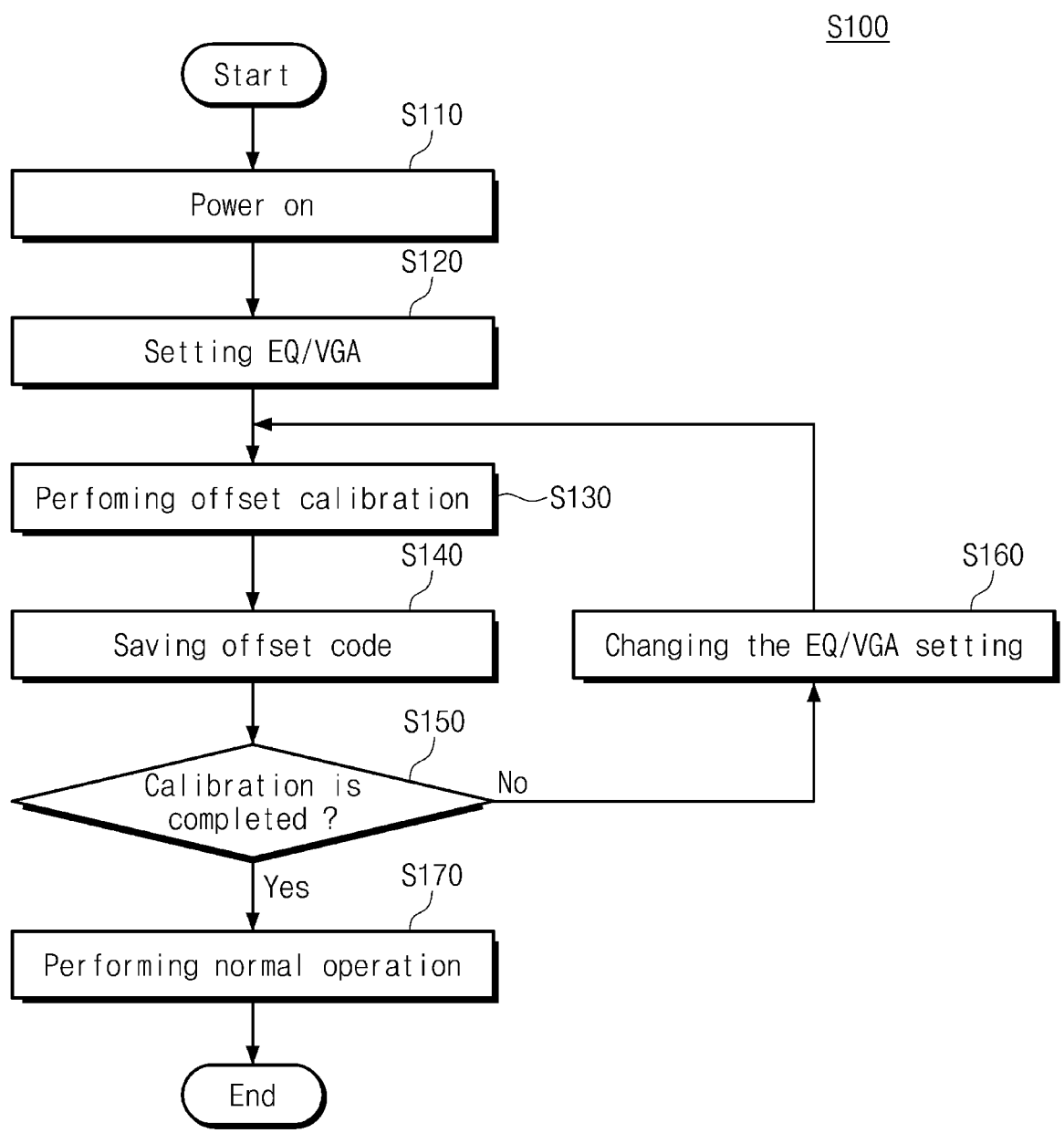
FIG. 7 is a flowchart illustrating an operation method of a receiver according to an embodiment of the present disclosure.

FIG. 7 is a flowchart illustrating an operation method of a receiver according to an embodiment of the present disclosure. Referring to FIGS. 2 and 7, the receiver 100 may store the offset code Code_O according to a coefficient of an equalizer (hereinafter referred to as "EQ") or a VGA by performing a calibration operation before the normal operation.

In operation S110, the receiver 100 may be powered on. According to an embodiment, operation S110 may be performed in the process of testing a wafer, performing a final test operation, or performing a power on reset operation. For example, the receiver 100 may be powered on and may then be reset. Afterwards, the receiver 100 may perform the offset calibration operation.

In operation S120, the receiver 100 may set a coefficient of the EQ and a coefficient of the VGA. For example, the coefficient of the EQ and the coefficient of the VGA may be set to a minimum value. The coefficient of the EQ and the coefficient of the VGA may drive the operation of the EQ and the VGA. The coefficient of the EQ and the coefficient of the VGA may vary depending on a channel. For example, the coefficient of the EQ optimized for a first channel may be EQ0, and the coefficient of the VGA optimized for the first channel may be VGA0. That is, when the coefficient of the EQ and the coefficient of the VGA are respectively set to EQ0 and VGA0 based on a characteristic of the first channel, a voltage offset may be minimized. According to an embodiment, the coefficient of the EQ and the coefficient of the VGA may be set by a user in operation S120.

In operation S130, the receiver 100 may perform offset calibration. The receiver 100 may apply the same voltage as a differential input signal to thereby drive the EQ and VGA, and may detect a voltage offset according to the EQ and VGA coefficients set in operation S120. For example, the receiver 100 may detect a voltage offset according to EQ0 and VGA0 and may generate a first offset code. The first offset code may correspond to an offset compensation voltage for removing the voltage offset according to EQ0 and VGA0.

In operation S140, the receiver 100 may store the offset code. The receiver 100 may store the offset code in the register 140 in the form of a lookup table. For example, the receiver 100 may store the first offset code together with EQ0 and VGA0 in the form of a lookup table. According to an embodiment, the register 140 may be a storage device present outside the receiver 100.

In operation S150, the receiver 100 may determine whether the offset calibration is completed. The offset calibration may be performed with respect to each of all coefficients of the EQ and the VGA or may be performed with respect to each of some of the coefficients of the EQ and the VGA. The above way to perform the offset calibration is variable depending on user settings, which will be described with reference to FIGS. 9A to 9C. When it is determined that the offset calibration is not completed, operation S160 is performed; when it is determined that the offset calibration is completed, operation S170 is performed.

In operation S160, the receiver 100 may change the coefficient of the EQ or the coefficient of the VGA. The receiver 100 may again perform operation S130 to operation S150 based on the changed coefficient of the EQ or the changed coefficient of the VGA.

In operation S170, the receiver 100 may determine that the offset calibration is completed and may perform the normal operation. The normal operation will be described in more detail with reference to FIG. 10.

Figure 8:
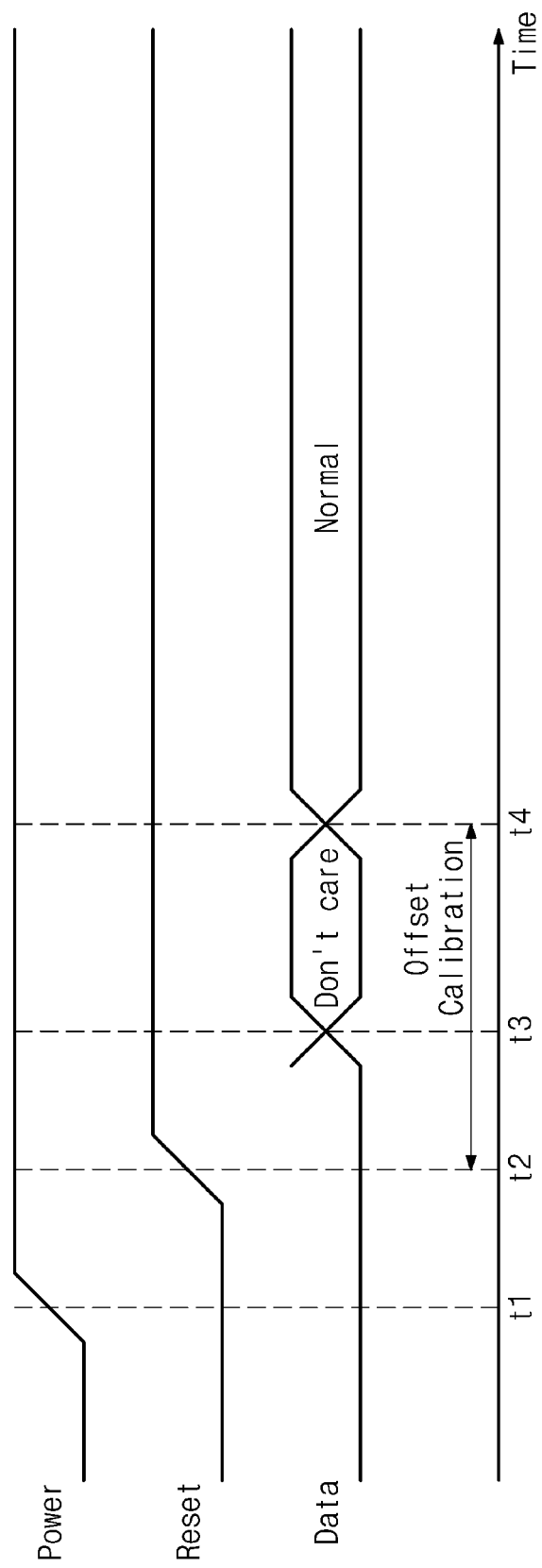
FIG. 8 is a timing diagram illustrating an initial operation of a receiver based on FIG. 7.

FIG. 8 is a timing diagram illustrating an initial operation of a receiver based on FIG. 7. Referring to FIGS. 2, 7, and 8, the receiver 100 may be powered on and may perform the offset calibration operation in an initial operation. According to an embodiment, the initial operation may also be referred to as a "power-up operation" or a "power-on reset (POR) operation".

The receiver 100 may be powered on at a first time t1. At a second time t2, a reset signal Reset may transition from logic low to logic high. The receiver 100 may start offset calibration from the second time t2. In other words, in the initial operation or the power-up operation, the receiver 100 may automatically perform the offset calibration.

The receiver 200 may receive data through a data signal Data from a third time t3. Data received from the third time t3 to a fourth time t4 may be data for stabilization of the receiver 100. For example, the data received from the third time t3 to the fourth time t4 may be meaningless data. Therefore, an interval from the third time t3 to the fourth time t4 may be called a "don't" care interval".

After the "don't care" interval ends, from the fourth time t4, the receiver 100 may receive meaningful data including information that an external device (e.g., a transmitter) intends to transmit. For example, the receiver 100 may start the normal operation from the fourth time t4. The fourth time t4 may refer to a time at which the offset calibration is completed. The offset calibration may be performed from the second time t2 to the fourth time t4.

Here, the offset calibration may include detecting a voltage offset according to coefficients of the EQ and the VGA and generating and storing an offset code for generating an offset compensation voltage removing the voltage offset. Accordingly, from the second time t2 to the fourth time t4, the receiver 100 may perform a series of operations of generating and storing an offset code while changing the coefficients of the EQ and the VGA.

As described above, the timing diagram of FIG. 8 may indicate an operation in which the receiver 100 stores an offset code by utilizing a time from the power-up to the normal operation. The above operation of the receiver 100 may be applied to an environment in which a configuration of a communication system is completed. In this case, the register 140 may include a volatile memory (e.g., a random access memory (RAM)), and the receiver 100 may perform the offset calibration whenever a power is turned on.

Figure 9B:

FIGS. 9A to 9C are diagrams illustrating embodiments of operation S150 to operation S160 of FIG. 7. FIG. 9A represents a lookup table LUTa generating offset codes with respect to all EQ coefficients and all VGA coefficients, FIG. 9B represents a lookup table LUTb generating offset codes with respect to some EQ coefficients and some VGA coefficients, and FIG. 9C represents a lookup table LUTc generating offset codes with respect to all EQ coefficients and some VGA coefficients. Operation S150 of FIG. 7 may be understood as an operation in which one of the lookup tables of FIGS. 9A to 9C is completed, but the present disclosure is not limited thereto.

Referring to FIGS. 7 and 9A, the EQ coefficients may correspond to first codes EQ0 to EQ9, and the VGA coefficients may correspond to second codes VGA0 to VGA3. The receiver 100 may generate 40 offset codes C00 to C39 according to the first codes EQ0 to EQ9 and the second codes VGA0 to VGA3 and may store the offset codes C00 to C39 in the lookup table LUTa. In operation S150 of FIG. 7, when the receiver 100 generates all the 40 offset codes C00 to C39, the receiver 100 may determine that the offset calibration is completed.

Referring to FIGS. 7 and 9B, the EQ coefficients may correspond to the first codes EQ0 to EQ9, and the VGA coefficients may correspond to the second codes VGA0 to VGA3. The receiver 100 may generate 20 offset codes according to third codes EQ0, EQ2, EQ4, EQ6, and EQ8 corresponding to some of the EQ coefficients and the second codes VGA0 to VGA3 and may store the offset codes in the lookup table LUTb. In operation S150 of FIG. 7, when the receiver 100 generates all the 20 offset codes, the receiver 100 may determine that the offset calibration is completed.

According to an embodiment, EQ and VGA setting for offset codes not generated may be required. For example, a specific communication environment may require the setting of a specific EQ code EQ3 and a specific VGA code VGA1, but an offset code corresponding to the specific EQ code EQ3 and the specific VGA code VGA1 may be absent from the lookup table LUTb. In this case, an offset code may be replaced with an offset code that is set to be similar to that according to the specific EQ code EQ3 and the specific VGA code VGA1.

For example, in the lookup table LUTb, offset codes for the specific EQ code EQ3 may be replaced with the offset codes for the EQ code EQ2 similar to the specific EQ code EQ3. That is, when offset codes for the specific EQ code EQ3 are required depending on a communication environment, a first set Set_1 for the EQ code EQ2 may replace a first set Set_1' for the specific EQ code EQ3. In this case, an offset code for the specific EQ code EQ3 and the specific VGA code VGA1 may be the offset code C12 corresponding to the EQ code EQ2 and the specific VGA code VGA1.

Referring to FIGS. 7 and 9C, the EQ coefficients may correspond to the first codes EQ0 to EQ9, and the VGA coefficients may correspond to the second codes VGA0 to VGA3. The receiver 100 may generate 20 offset codes according to the first codes EQ0 to EQ9 and fourth codes VGA0 and VGA2 corresponding to some of the VGA coefficients and may store the offset codes in the lookup table LUTc. In operation S150 of FIG. 7, when the receiver 100 generates all the 20 offset codes, the receiver 100 may determine that the offset calibration is completed.

According to an embodiment, offset codes not generated may be replaced with offset codes of similar settings. For example, in the lookup table LUTc, offset codes for the specific VGA code VGA1 may be replaced with the offset codes C00, C01, C02, C03, C04, C05, C06, C07, C08, and C09 for the VGA code VGA0 similar to the specific VGA code VGA1. That is, when offset codes for the specific VGA code VGA1 are required depending on a communication environment, a second set Set_2 for the VGA code VGA0 may replace a second set Set_2' for the specific VGA code VGA1. In this case, an offset code for the specific EQ code EQ3 and the specific VGA code VGA1 may be the offset code C03 corresponding to the specific EQ code EQ3 and the VGA code VGA0.

As described above, the lookup table LUTb of FIG. 9B and the lookup table LUTc of FIG. 9C may be uncertain compared to the lookup table LUTa of FIG. 9A. That is, a data error rate when a voltage offset is removed based on the lookup table LUTb of FIG. 9B and the lookup table LUTc of FIG. 9C may be higher than a data error rate when a voltage offset is removed based on the lookup table LUTa of FIG. 9A. In contrast, when the lookup table LUTb of FIG. 9B and the lookup table LUTc of FIG. 9C are used, an offset calibration time may be shortened. Accordingly, in a communication environment in which a communication speed is more important than data accuracy, the lookup table LUTb of FIG. 9B and the lookup table LUTc of FIG. 9C may be used.

Figure 10:
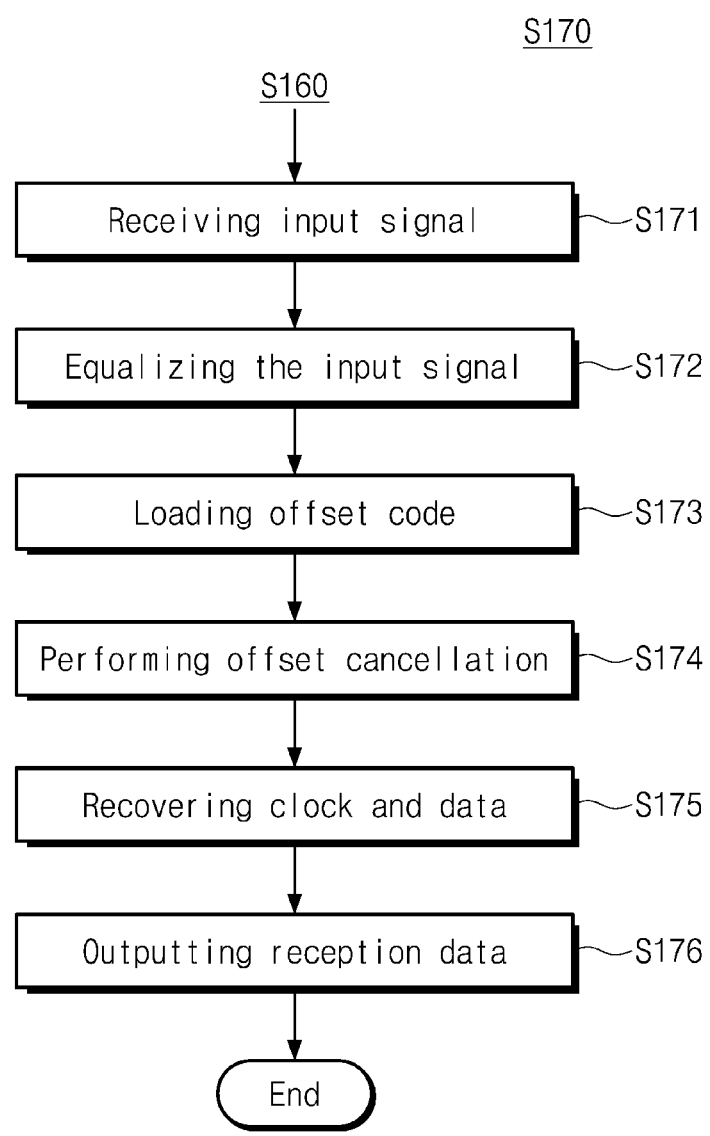
FIG. 10 is a flowchart illustrating operation S170 of FIG. 7 in detail.

FIG. 10 is a flowchart illustrating operation S170 of FIG. 7 in detail. Referring to FIGS. 2, 7, and 10, the receiver 100 may remove a voltage offset depending on the offset code Code_O during the normal operation.

In operation S171, the receiver 100 may receive an input signal. The input signal may be the differential input signal INP and INN of FIG. 2. The input signal may be a signal corresponding to a modification of a transmit signal, which includes information to be transmitted, due to a channel. That is, the input signal may include meaningful data.

In operation S172, the receiver 100 may perform an equalizing operation on the input signal. For example, the receiver 100 may correct a signal distortion due to a high-frequency component attenuated while the input signal passes through the channel. For example, the receiver 100 may amplify the input signal with a variable gain. That is, the receiver 100 that includes an equalizer and an amplifier may adjust a waveform of the input signal and may amplify a magnitude of the input signal.

According to an embodiment, the equalizing operation may include at least one of an auto equalizing operation, a manual equalizing operation, and a packet equalizing operation. For example, the auto equalizing operation may include an operation of searching for (or selecting) an equalizer (EQ) coefficient, at which a data error is minimum, while automatically changing EQ coefficients. That is, operation S172 may cause a change of an EQ coefficient. For example, the manual equalizing operation may include an operation of searching for an EQ coefficient desired by a user while manually changing EQ coefficients, for example, changing according to a user input. For example, the packet equalizing operation may include an operation of searching for an optimal EQ coefficient while changing EQ coefficients through a packet. According to an embodiment, the EQ coefficient with the minimum data error, the EQ coefficient desired by the user, and the optimal EQ coefficient may be the same or different.

A voltage offset may be generated due to the following: a change of a coefficient of an equalizer or an amplifier due to a channel change or an equalizing operation. In operation S173, the receiver 100 may load an offset code according to a coefficient of the equalizer and a coefficient of the amplifier. For example, the receiver 100 may load an offset code corresponding to the coefficient of the equalizer and the coefficient of the amplifier, based on a lookup table stored in the register 140.

According to an embodiment, the receiver 100 may fail to search for an offset code corresponding to a set coefficient of the equalizer and a set coefficient of the amplifier. This may occur when some offset codes are stored in the register 140 for the purpose of a communication speed, as described with reference to FIGS. 9B and 9C. In this case, the receiver 100 may search for an equalizer coefficient and an amplifier coefficient that are the most similar to the set equalizer coefficient and the set amplifier coefficient and may load an offset code corresponding to the found equalizer coefficient and the found amplifier coefficient. For example, the most similar equalizer coefficient and the most similar amplifier coefficient may be an equalizer coefficient and a set amplifier coefficient adjacent to the set equalizer coefficient and the set amplifier coefficient in the lookup table.

In operation S174, the receiver 100 may remove the voltage offset based on the loaded offset code. For example, the offset cancellation circuit 150 may receive the offset code and may output an offset compensation voltage corresponding to the received offset code. The offset compensation voltage may cancel out the voltage offset.

In operation S175, the receiver 100 may output the output signal SIG_O from which the voltage offset is removed and may recover a clock signal and data from the output signal SIG_O. For example, the clock and data recovery circuit 120 may recover a reference clock signal from the output signal SIG_O from which the voltage offset is removed and may output the recovered data sDAT in synchronization with the reference clock signal. The order of performing operation S172 to operation S175 is not limited to the example of FIG. 10. For example, a clock and data recovery operation may be performed in parallel with the equalizing operation. In detail the auto equalizing operation may be performed once at the beginning of the normal operation or may be performed plural times at different timings while receiving data.

In operation S176, the receiver 100 may output the reception data rDAT. The reception data rDAT may be generated by processing the recovered data sDAT. The reception data rDAT may include information corresponding to transmission data.

Figure 11:
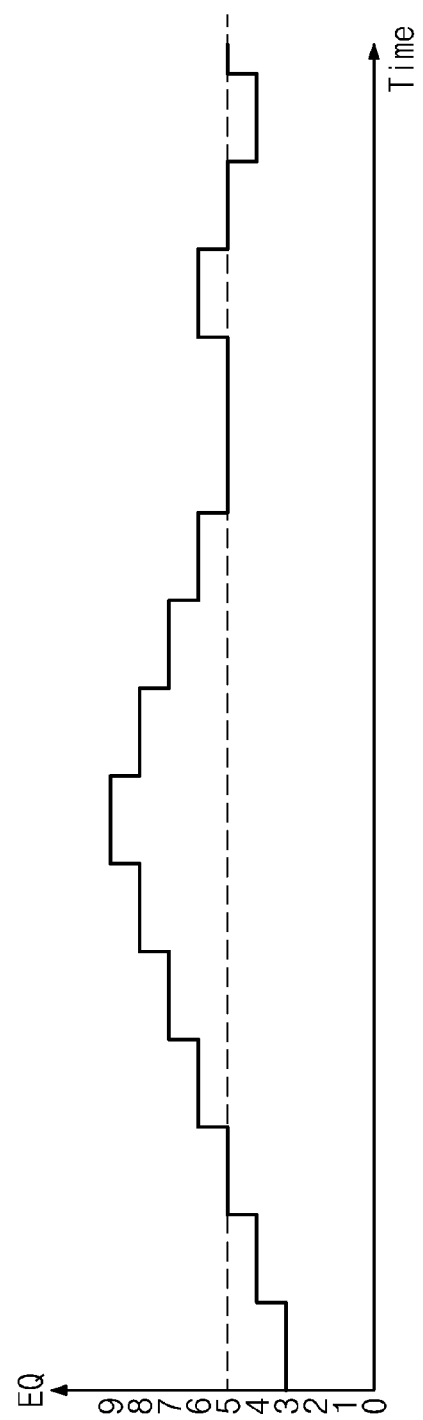
FIG. 11 is a diagram illustrating an example in which auto equalizing is performed in operation S172 of FIG. 10.

FIG. 11 is a diagram illustrating an example in which auto equalizing Auto EQ is performed in operation S172 of FIG. 10. Referring to FIGS. 10 and 11, the receiver 100 may perform auto equalizing during the normal operation.

According to an embodiment, the auto equalizing may include searching for an equalizer (EQ) coefficient or an EQ code, at which a data error is minimum, while changing an EQ coefficient from EQ0 to EQ9. FIG. 11 shows the case where the auto equalizing is performed from EQ3 because data recovery is impossible in the case of EQ0, EQ1, and EQ2 at which the number of data errors is a reference value or more.

After equalizing while changing an EQ coefficient from EQ3 to EQ9 over time, the receiver 100 may change an EQ coefficient so as to converge into EQ5. For example, EQ5 may be an optimum EQ coefficient at which a data error is minimum.

As described above, in performing the auto equalizing, the receiver 100 may change an EQ coefficient in real time. Because the receiver 100 stores an offset code according to an EQ coefficient in advance before the normal operation, the receiver 100 may compensate for a voltage offset due to a change of an EQ coefficient in real time. Accordingly, as the receiver 100 compensates for an offset code according to an EQ coefficient in real time, the receiver 100 may show optimum performance at the converged EQ value (e.g., EQ5).

Figure 12A:
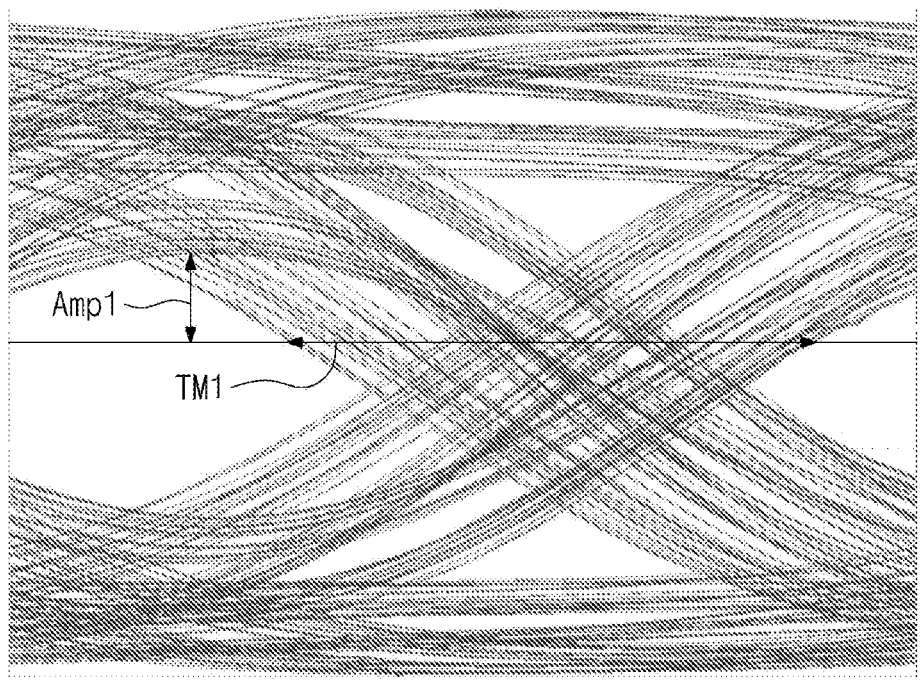
FIGS. 12A and 12B are diagrams illustrating a change of an eye diagram according to an embodiment of the present disclosure.
Figure 12B:
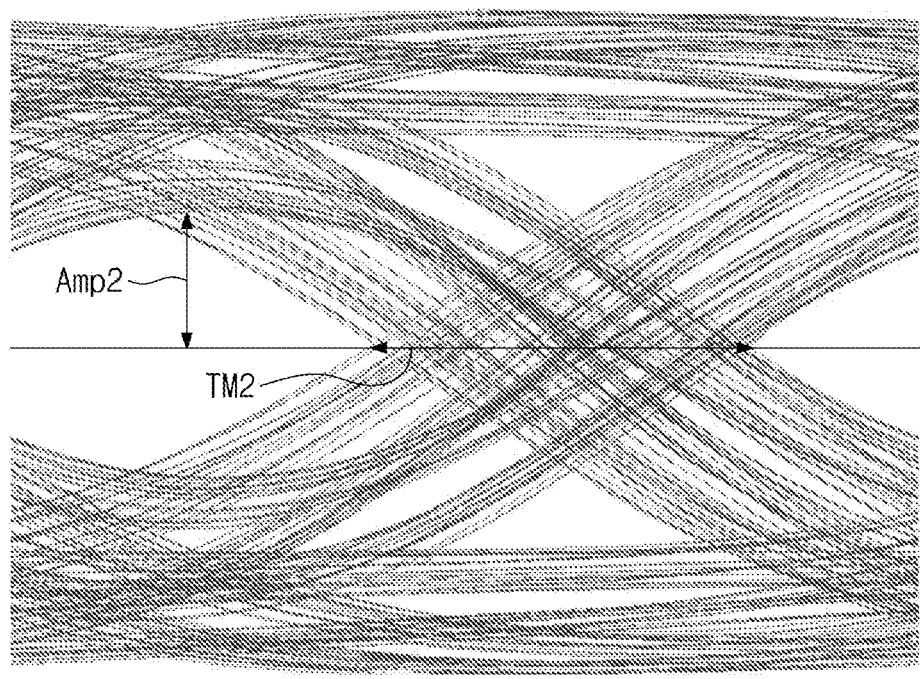

FIGS. 12A and 12B are diagram illustrating a change of an eye diagram according to an embodiment of the present disclosure. FIG. 12A is an eye diagram corresponding to the case where the offset calibration is performed at a specific EQ coefficient and the EQ coefficient is changed during the normal operation, and FIG. 12B is an eye diagram corresponding to the case where an offset code corresponding to an EQ coefficient is stored in advance, and an offset code is applied in real time while changing the EQ coefficient during the normal operation.

Referring to FIG. 12A, when an EQ coefficient is changed during the normal operation, it may be difficult to perform the offset calibration to cope with the change of the EQ coefficient. Data transmission should be blocked to perform the offset calibration. For this reason, this way may not be appropriate for image data communication for the purpose of continuous data transmission. Therefore, a change of an EQ coefficient, which is made during the normal operation, may appear as a voltage offset. As such, a first timing margin TM1 may be 140 ps, and a first amplitude Amp1 in a high interval may be 63 mV.

Referring to FIG. 12B, the receiver 100 may apply an offset code in real time while changing an EQ coefficient during the normal operation. In this case, referring to the eye diagram of FIG. 12B, a second timing margin TM2 may be 93 ps, and a second amplitude Amp2 in a high interval may be 109 mV. Compared to FIG. 12A, a timing margin may be improved, and an amplitude in a high interval may increase. As such, the operation method of the receiver 100 may be essential to design a high-speed and high-performance receiver.

FIG. 13 is a timing diagram illustrating an initial operation of a receiver according to an embodiment of the present disclosure. Referring to FIGS. 2, 7, and 13, the receiver 100 may be powered on and may perform the offset calibration operation in the initial operation. FIG. 13 may be a timing diagram associated with the process of testing an operation of the receiver 100. According to an embodiment, in the process of testing a wafer or performing a final test operation, the receiver 100 may perform offset calibration without input data.

The receiver 100 may be powered on at a first time t1. At a second time t2, the reset signal Reset may transition from logic low to logic high. The receiver 100 may start offset calibration from the second time t2. That is, the receiver 100 may perform a series of operations of generating and storing a corresponding offset code while changing coefficients of an EQ and a VGA from the second time t2.

As described above, the timing diagram of FIG. 13 may indicate an operation in which the receiver 100 stores an offset code in the process of testing an operation of the receiver 100. The above operation of the receiver 100 may be utilized when a time from the power-up to the normal operation is short. In this case, the register 140 may include a nonvolatile memory (e.g., a read only memory (ROM)). According to an embodiment, the register 140 may include a one-time programmable (OTP) memory. The OTP memory is collectively referred to as a "memory" in which a write operation is impossible after one program operation and only a read operation is possible.

After a test passes, in the normal operation, the receiver 100 may compensate for a voltage offset based on an offset code stored in the register 140. The receiver 100 need not perform separate offset calibration (refer to FIG. 8) in normal operation.

Figure 14:
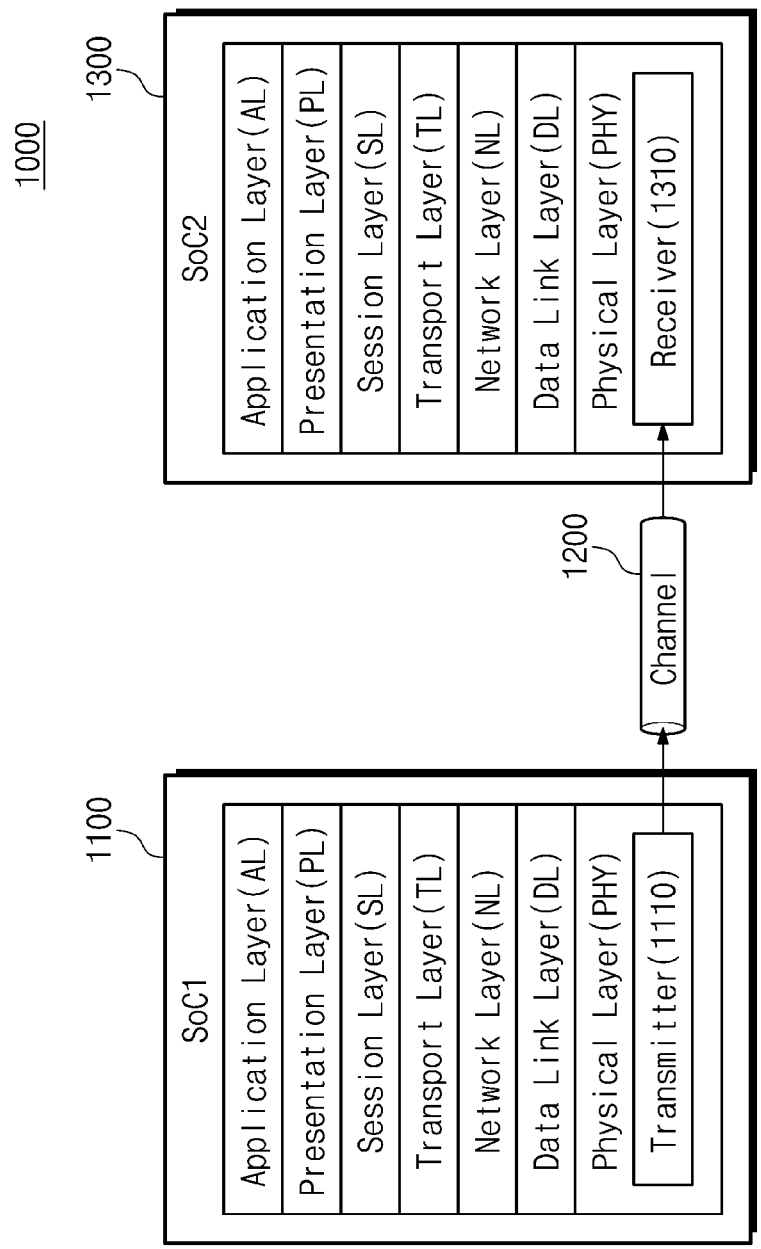
FIG. 14 is a block diagram illustrating a communication system to which a receiver according to an embodiment of the present disclosure is applied.

FIG. 14 is a block diagram illustrating a communication system to which a receiver according to an embodiment of the present disclosure is applied. A communication system 1000 may include a first system on chip (SoC) 1100, a second SoC 1300, and a channel 1200.

According to an embodiment, the first SoC 1100 and the second SoC 1300 may communicate with each other based on the open system interconnection (OSI) 7-layer structure proposed by the international standard organization. For example, each of the first SoC 1100 and the second SoC 1300 may include an application layer AL, a presentation layer PL, a session layer SL, a transport layer TL, a network layer NL, a data link layer DL, and a physical layer PHY.

The layers of the first SoC 1100 may physically or logically communicate with the corresponding layers of the second SoC 1300. The application layer AL, the presentation layer PL, the session layer SL, the transport layer TL, the network layer NL, the data link layer DL, and the physical layer PHY of the first SoC 1100 may logically or physically communicate with the application layer AL, the presentation layer PL, the session layer SL, the transport layer TL, the network layer NL, the data link layer DL, and the physical layer PHY of the second SoC 1300, respectively.

The physical layer PHY of the first SoC 1100 may include a transmitter 1110. The transmitter 1110 may be implemented within the physical layer PHY of the first SoC 1100. The physical layer PHY of the second SoC 1300 may include a receiver 1310. The receiver 1310 may be implemented within the physical layer PHY of the second SoC 1300.

The transmitter 1110 of the first SoC 1100 may send data to the receiver 1310 of the second SoC 1300 over the channel 1200. The channel 1200 may be the channel CH of FIG. 1. The receiver 1310 may be the receiver 100 of FIG. 2 or the receiver 200 of FIG. 4. That is, the receiver 1310 may in advance store an offset code according to coefficients of an EQ and a VGA before the normal operation and may compensate for a voltage offset, which is caused by a coefficient change of the EQ and the VGA made during the normal operation, in real time based on the stored offset code.

According to the present disclosure, a receiver may perform offset calibration according to a coefficient change of an equalizer and an amplifier before a normal operation and thus may remove a voltage offset in real time without a break of an input signal even though a coefficient of the equalizer or the amplifier is changed during the normal operation.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operation method of a receiver comprising:
setting, as an equalizer coefficient, a coefficient of an equalizer based on one of a plurality of first codes;
setting, as an amplifier coefficient, a coefficient of an amplifier based on one of a plurality of second codes;
performing offset calibration by driving the equalizer and the amplifier based on the coefficient of the equalizer and the coefficient of the amplifier;
storing an offset code corresponding to a voltage offset generated when the equalizer is driven by the equalizer coefficient and the amplifier is driven by amplifier coefficient;
determining whether the offset calibration is completed;
in response to determining that the offset calibration is completed, performing a normal operation of obtaining reception data from an input signal; and
removing the voltage offset based on the offset code, in the normal operation.

2. The method of claim 1, wherein the equalizer coefficient and the amplifier coefficient vary depending on a characteristic of a communication channel.

3. The method of claim 1, wherein the storing of the offset code includes:
generating offset codes respectively corresponding to all or a part of the plurality of first codes and all or a part of the plurality of second codes; and
storing the offset codes in a register in the form of a lookup table.

4. The method of claim 3, wherein the register includes a volatile memory or a nonvolatile memory.

5. The method of claim 3, wherein the offset calibration is determined to be completed when all the offset codes respectively corresponding to the all or the part of the plurality of first codes and the all or the part of the plurality of second codes are stored in the register.

6. The method of claim 5, wherein the offset calibration is determined to be not completed when at least one of all the offset codes respectively corresponding to the all or the part of the plurality of first codes and the all or the part of the plurality of second codes is not stored in the register; and
changing at least one code of the plurality of first codes and the plurality of second codes in response to the determining that the offset calibration is not completed.

7. The method of claim 6, further comprising:
resetting the equalizer coefficient and the amplifier coefficient based on the at least one code thus changed; and
performing the offset calibration based on the reset equalizer coefficient and the reset amplifier coefficient.

8. The method of claim 5, further comprising:
in response to the determining that the offset calibration is completed,
receiving the input signal in the normal operation;
performing equalizing on the input signal while adjusting a waveform of the input signal or amplifying a magnitude of the input signal;
loading a corresponding offset code from the register;
removing the voltage offset based on the corresponding offset code;
recovering data from the input signal from which the voltage offset is removed; and
outputting the recovered data.

9. The method of claim 8, wherein the performing of the equalizing includes:
performing at least one of auto equalizing, manual equalizing, and packet equalizing.

10. The method of claim 8, wherein the loading of the corresponding offset code includes:
searching the register for the corresponding offset code associated with the equalizer coefficient driving the equalizer and the amplifier coefficient driving the amplifier; and
when the corresponding offset code is not found, loading another offset code from the lookup table.

11. A receiver comprising:
an analog front end configured to receive an input signal including transmission data and to output an output signal by adjusting a waveform of the input signal and amplifying a magnitude of the input signal;
a clock and data recovery circuit configured to recover a clock signal from the output signal and to recover data based on the clock signal such that the recovered data corresponding to the transmission data are output;
a logic circuit configured to detect a voltage offset from the recovered data and to generate an offset code for removing the voltage offset;
a register configured to store the offset code in the form of a lookup table; and
an offset cancellation circuit configured to generate an offset compensation signal based on the offset code to remove the voltage offset, wherein
the analog front end includes a first stage, a second state, and a third stage, and
wherein the offset cancellation circuit is connected between the first stage and the second stage.

12. The receiver of claim 11, wherein the first stage is configured to receive the input signal and amplify the input signal with a first gain,
wherein the second stage is configured to receive a first output signal of the first stage and the offset compensation signal and amplify a sum of the first output signal and the offset compensation signal with a second gain, and
wherein the third stage is configured to receive a second output signal of the second stage and amplify the second output signal with a third gain so as to be output as the output signal.

13. The receiver of claim 12, wherein the first gain varies depending on a coefficient of an equalizer or an amplifier included in the first stage, the second gain varies depending on a coefficient of an equalizer or an amplifier included in the second stage, and the third gain varies depending on a coefficient of an equalizer or an amplifier included in the third stage, and
wherein the logic circuit adjusts the coefficient of the equalizer or the amplifier included in each of the first to third stages, based on a control signal.

14. The receiver of claim 13, wherein the offset code is determined by at least two codes among the first gain, the second gain, and the third gain, and
wherein the register is configured to store the offset code together with the at least two codes among the first gain, the second gain, and the third gain in the form of the lookup table.

15. The receiver of claim 11, wherein, in an offset calibration operation, the logic circuit is configured to generate the offset code and store the offset code in the register,
wherein, in a normal operation, the logic circuit is configured to load the offset code from the register and provide the offset code to the offset cancellation circuit, and
wherein the offset calibration operation is performed before the normal operation.

16. A receiver comprising:
an equalizer configured to set an equalizer coefficient based on one of a plurality of first codes;
an amplifier configured to set an amplifier coefficient based on one of a plurality of second codes;
a logic circuit configured to generate the plurality of first codes and the plurality of second codes to control the equalizer coefficient and the amplifier coefficient;
an offset cancellation circuit configured to remove a voltage offset, which is generated when the equalizer is driven by the equalizer coefficient and when the amplifier is driven by the amplifier coefficient, based on an offset code; and
a register configured to store the offset code,
wherein, in an offset calibration operation, the logic circuit is configured to change the equalizer coefficient and the amplifier coefficient through the plurality of first codes and the plurality of second codes and generate the offset code corresponding to the voltage offset, and
wherein, in a normal operation, the logic circuit is configured to load a corresponding offset code associated with the equalizer coefficient and the amplifier coefficient and provide the corresponding offset code to the offset cancellation circuit.

17. The receiver of claim 16, wherein, in the offset calibration operation, the logic circuit is configured to generate a plurality of offset codes respectively corresponding to all or a part of the plurality of first codes and all or a part of the plurality of second codes.

18. The receiver of claim 17, wherein the register is configured to store the plurality of offset codes in the form of a lookup table.

19. The receiver of claim 18, wherein, in the normal operation, the logic circuit is configured to search the register for the corresponding offset code associated with a coefficient of the equalizer being driven and a coefficient of the amplifier being driven and load another offset code from the lookup table when the corresponding offset code is not found.

* * * * *